United States Patent [19]
Davis et al.
[11] 4,137,084
[45] Jan. 30, 1979

[54] PROCESS FOR PRODUCING PRESSURE-SENSITIVE COPY SHEETS USING NOVEL RADIATION CURABLE COATINGS

[75] Inventors: Gerald T. Davis; Dale R. Shackle, both of Chillicothe, Ohio

[73] Assignee: The Mead Corporation, Dayton, Ohio

[21] Appl. No.: 827,124

[22] Filed: Aug. 24, 1977

Related U.S. Application Data

[62] Division of Ser. No. 684,462, May 7, 1976, Pat. No. 4,091,122.

[51] Int. Cl.$^2$ .............................................. C09D 11/00

[52] U.S. Cl. ........................................ 106/21; 427/44; 427/54; 427/150; 427/151; 427/152

[58] Field of Search ............... 427/401, 152, 153, 150, 427/151, 44, 54; 282/27.5; 428/306, 307, 342, 323, 327, 537; 106/14.5, 19, 21, 23, 74; 260/42.21, 42.29

[56] References Cited

U.S. PATENT DOCUMENTS

| | | | |
|---|---|---|---|
| 2,170,040 | 8/1939 | Grupe | 427/152 |
| 2,781,278 | 2/1957 | Harmon | 427/152 |
| 3,759,807 | 9/1973 | Osborn et al. | 427/44 |
| 3,955,025 | 5/1976 | Matsukawa | 427/152 |
| 3,957,495 | 5/1976 | Teranishi et al. | 427/150 |
| 3,979,270 | 9/1976 | Trecker et al. | 427/54 |
| 3,981,523 | 9/1976 | Maalouf | 427/152 |
| 3,996,405 | 12/1976 | Porter | 427/150 |
| 4,012,554 | 5/1977 | Miller et al. | 427/150 |

*Primary Examiner*—Ronald H. Smith
*Assistant Examiner*—Janyce A. Bell
*Attorney, Agent, or Firm*—Charles N. Shane, Jr.; Stephen H. Cagle; Wilson G. Palmer

[57] ABSTRACT

A process is provided for producing a pressure-sensitive carbonless transfer or record sheet comprising the steps of preparing a liquid chromogenic coating composition by mixing chromogenic material with a liquid radiation curable substance, the chromogenic material comprising either an acidic color developer of the electron donator type or a color precursor of the electron accepting type. The liquid coating composition is coated onto a web or substrate at a coat weight of from about 0.2 pounds to about 8.0 pounds per 3300 square feet of substrate. The coated web is then exposed to radiation for a time sufficient to cure the liquid coating composition to a tack-free film. A novel liquid chromogenic coating composition is produced, the coating composition comprising a chromogenic material and a radiation curable substance. A pressure-sensitive copy sheet is produced, the copy sheet comprising a substrate having a plurality of surfaces at least one of the surfaces being coated with a tack-free film, the film comprising a radiation cured resin containing a chromogenic material dispersed.

5 Claims, No Drawings

PROCESS FOR PRODUCING PRESSURE-SENSITIVE COPY SHEETS USING NOVEL RADIATION CURABLE COATINGS

This is a division of application Ser. No. 684,462, filed May 7, 1976, now U.S. Pat. No. 4,091,122.

BACKGROUND OF THE INVENTION

This invention relates to the production of pressure-sensitive carbonless copy sheets for use in combination with a pressure-sensitive transfer sheet of the type whereby on application of pressure a color precursor is transferred to a record sheet which then develops a visible image. More particularly, it relates to the production of a pressure-sensitive carbonless copy sheets having a coating containing a chromogenic material, which coating is cured to a solid film by radiation means. For purposes of this application ther term "chromogenic" shall be understood to refer to materials such as color precursors, color developers, color formers and may additionally contain color inhibitors and the like. The term shall be understood to refer to such materials whether in microencapsulated, capsulated, dispersed or other form. For purposes of this application the term CF, shall be understood to refer to a coating normally used on a record sheet. In addition the term CB shall be understood to refer to a coating normally used on a transfer sheet.

Carbonless paper, briefly stated, is a standard type of paper wherein during manufacture the backside of the paper substrate is coated with what is referred to as a CB coating, the CB coating containing one or more color precursors generally in capsular form. At the same time the front side of the paper substrate is coated during manufacture with what is referred to as a CF coating, which contains one or more color developers. Both the color precursor and the color developer remain in the coating compositions on the respective back and front surfaces of the paper in transparent form. This is true until the CB and CF coatings are brought into abutting relationship and sufficient pressure, as by a typewriter, is applied to rupture the CB coating to release the color precursor. At this time the color precursor contacts the CF coating and reacts with the color developer therein to form an image. Carbonless paper has proved to be an exceptionally valuable image transfer media for a variety of reasons only one of which is the fact that until a CB coating is placed next to a CF coating both the CB and the CF are in an inactive state as the co-reactive elements are not in contact with one another. Patents relating to carbonless paper products are:

U.S. Pat. No. 2,712,507 (1955) to Green
U.S. Pat. No. 2,730,456 (1956) to Green et al.
U.S. Pat. No. 3,455,721 (1969) to Phillips et al.
U.S. Pat. No. 3,466,184 (1969) to Bowler et al.
U.S. Pat. No. 3,672,935 (1972) to Miller et al.

A third generation product which is in an advanced stage of development and commercialization at this time and which is available in some business sectors is referred to as self-contained paper. Very generally stated self-contained paper refers to an image transfer system wherein only one side of the paper needs to be coated and the one coating contains both the color precursor, generally in encapsulated form, and the color developer. Thus when pressure is applied, again as by a typewriter or other writing instrument, the color precursor capsule is ruptured and reacts with the surrounding color developer to form an image. Both the carbonless paper image transfer system and the self-contained transfer system have been the subject of a great deal of patent activity. A typical autogeneous record material system, earlier sometimes referred to as "self-contained" because all elements for making a mark are in a single sheet, is disclosed in U.S. Pat. No. 2,730,457 (1956) to Green.

A disadvantage of coated paper products such as carbonless and self-contained stems from the necessity of applying a liquid coating composition containing the color forming ingredients during the manufacturing process. In the application of such coatings volatile solvents are sometimes used which then in turn requires evaporation of excess solvent to dry the coating thus producing volatile solvent vapors. An alternate method of coating involves the application of the color forming ingredients in an aqueous slurry, again requiring removal of excess water by drying. Both methods suffer from serious disadvantages. In particular the solvent coating method necessarily involves the production of generally volatile solvent vapors creating both a health and a fire hazard in the surrounding environment. When using an aqueous solvent system the water must be evaporated which involves the expenditure of significant amounts of energy. Further, the necessity of a drying step requires the use of complex and expensive apparatus to continuously dry a substrate which has been coated with an aqueous coating compound. A separate but related problem involves the disposal of polluted water. The application of heat not only is expensive, making the total paper manufacturing operation less cost effective, but also is potentially damaging to the color forming ingredients which are generally coated onto the paper substrate during manufacture. High degrees of temperature in the drying step require specific formulation of wall-forming compounds which permit the use of excess heat. The problems encountered in the actual coating step are generally attributable to the necessity for a heated drying step following the coating operation.

In general, patents concerned with the production and application of liquid resin compositions containing no volatile solvent, which resin compositions are subsequently cured by radiation to a solid film are:

U.S. Pat. No. 3,551,235 (1970) to Bassemir et al.
U.S. Pat. No. 3,551,246 (1970) to Bassemir et al.
U.S. Pat. No. 3,551,311 (1970) to Nass et al.
U.S. Pat. No. 3,558,387 (1971) to Bassemir et al.
U.S. Pat. No. 3,661,614 (1972) to Bassemir et al.
U.S. Pat. No. 3,754,966 (1973) to Newman et al.
U.S. Pat. No. 3,772,062 (1973) to Shur et al.
U.S. Pat. No. 3,772,171 (1973) to Savageau et al.
U.S. Pat. No. 3,801,329 (1974) to Sandner et al.
U.S. Pat. No. 3,819,496 (1974) to Roskott et al.
U.S. Pat. No. 3,847,769 (1974) to Garratt et al.
U.S. Pat. No. 3,847,768 (1974) to Kagiya et al.

These compositions generally also contain a pigment or a dye. Such resin compositions are useful for protective coatings and fast drying inks. U.S. Pat. No. 3,754,966 describes the production of an ink releasing dry transfer element which can be used as a carbon paper or typewriter ribbon.

The novel liquid coating compositions of this invention contain a chromogenic material in addition to a liquid radiation curable substance. Prior to the discovery of this invention, it was not known that chromogenic materials could be incorporated into radiation curable coating compositions and retain their chromogenic properties after the resin is cured by radiation to a tack-free film. For purposes of this disclosure, a tack-free film is one which will separate cleanly from a cotton ball lightly pressed against the film. The cotton fibers will not adhere to the film surface.

As can be appreciated from the above, the continuous production of a manifold paper product would require simultaneous coating, simultaneous drying, simultaneous printing, and simultaneous collating and finishing of a plurality of paper substrates. Thus, Busch in Canadian Pat. No. 945,443 indicates that in order to do so there should be a minimum wetting of the paper web by water during application of the CB emulsion coat. For that purpose a high solids content emulsion is used and special driers are described in Busch. However, because of the complexities of the drying step this process has not been commercially possible to date. More particularly, the drying step involving solvent evaporation and/or water evaporation and the input of heat does not permit the simultaneous or continuous manufacture of manifold forms. In addition to the drying step which prevents continuous manifold form production the necessity for the application of heat for solvent evaporation is a serious disadvantage since aqueous and other liquid coatings require that special grades of generally more expensive paper be employed and even these often result in buckling, distortion or warping of the paper since water and other liquids tend to strike through or penetrate the paper substrate. Additionally, aqueous coatings and some solvent coatings are generally not suitable for spot application or application to limited areas of one side of a sheet of paper. They are generally suitable only for application to the entire surface area of a sheet to produce a continuous coating.

Another problem which has been commonly encountered in attempts to continuously manufacture manifold forms has been the fact that a paper manufacturer must design paper from a strength and durability standpoint to be adequate for use in a large variety of printing and finishing machines. This requires a paper manufacturer to evaluate the coating apparatus of the forms manufacturers he supplies in order that the paper can be designed to accommodate the apparatus and process designed exhibiting the most demanding conditions. Because of this, a higher long wood fiber to short wood fiber ratio must be used by the paper manufacture than is necessary for most coating, printing or finishing machines in order to achieve a proper high level of strength in his finished paper product. This makes the final sheet product more expensive as the long fiber is generally more expensive than a short fiber. In essence, the separation of paper manufacturer from forms manufacturer, which is now common, requires that the paper manufacturer overdesign his final product for a variety of machines, instead of specifically designing the paper product for known machine conditions.

By combining the manufacturing, printing and finishing operations into a single on-line system a number of advantages are achieved. First, the paper can be made using ground wood and a lower long fiber to short fiber ratio as was developed supra. This is a cost and potentially a quality improvement in the final paper product. A second advantage which can be derived from a combination of manufacturing, printing and finishing is that waste or re-cycled paper hereinafter sometimes referred to as "broke" can be used in the manufacture of the paper since the quality of the paper is not of an overdesigned high standard. Third and most importantly, several steps in the normal process of the manufacture of forms can be completely eliminated. Specifically drying steps can be eliminated by using a non-aqueous, solvent-free coating system and in addition the warehousing and shipping steps can be avoided thus resulting in a more cost efficient product.

Additionally, by using appropriate coating methods, namely radiation curable coating compositions and methods, and by combining the necessary manufacturing and printing steps, spot printing and spot coating can be realized. Both of these represent a significant cost savings but nevertheless one which is not generally available when aqueous or solvent coatings are used or where the manufacture, printing and finishing of paper are performed as separate functions. An additional advantage of the use of radiation curable coating compositions and the combination of paper manufacturer, printer and finisher is that when the option of printing followed by coating is available significant cost advantages occur.

STATEMENT OF THE INVENTION

A process is provided for producing a pressure-sensitive carbonless transfer or record sheet comprising the steps of preparing a liquid chromogenic coating composition by mixing chromogenic material with a liquid radiation curable substance, the chromogenic material comprising either an acidic color developer of the electron donator type or a color precursor of the electron accepting type. The liquid coating composition is coated onto a web or substrate at a coat weight of from about 0.2 pounds to about 8.0 pounds per 3300 square feet of substrate. The coated web is then exposed to radiation for a time sufficient to cure the liquid coating composition to a tack-free film. A novel liquid chromogenic coating composition is produced, the coating composition comprising a chromogenic material and a radiation curable substance. A pressure-sensitive copy sheet is produced, the copy sheet comprising a substrate having a plurality of surfaces, at least one of the surfaces being coated with a tack-free film, the film comprising a radiation cured resin containing a chromogenic material dispersed.

DETAILED DESCRIPTION OF THE INVENTION

The chromogenic coating composition of this invention is essentially a dispersion of a chromogenic material in a liquid radiation curable substance. The chromogenic material can be either soluble or insoluble in the liquid radiation curable substance and the color precurors are preferably in microencapsulated or dispersed form. Insoluble chromogenic color developers, for use in preparing carbonless record sheets such as the acid clays, are present in the coating composition as a dispersed particulate solid. Most organic color developers are soluble in the radiation curable substance of this invention.

The coating composition can contain additional materials which function as photoinitiators. Addition of these materials depends upon the particular method of curing the chromogenic coating. Filler materials can also be added to modify the properties of the cured film. The use of non-reactive solvents, which require heat to remove them during the drying or curing of the coated film, is avoided. However, minor amounts of non-reactive solvents can be tolerated without requiring a separate step for drying during any subsequent curing step. Although the product and process of this invention are useful in the manufacture of a variety of products the preferred use of the process and product of this invention is in the continuous production of a manifold carbonless substrate.

The chromogenic color developers most useful in the practice of this invention are the acidic electron-acceptors and include acid clays such as attapulgus clay, and silton clay, phenolic materials such as 2-ethylhexylgallate, 3,5-di-tert-butyl salicylic acid, phenolic resins of the novolak type and metal modified phenolic materials such as the zinc salt of 3,5-di-tert-butyl salicylic acid and the zinc modified novolak type resins. The most preferred chromogenic color developers are the novolaks of p-phenylphenol, p-octylphenol and p-tert-butylphenol. Mixtures of these color developers may be used, if desired. They can be present in the liquid chromogenic composition in an amount of from about 25% to about 75% by weight of the chromogenic composition. The preferred range is from about 35% to about 65%, and the most preferred range is from about 40% to about 55%.

The chromogenic color precursors most useful in the practice of this invention are the electron-donor type and include the lactone phthalides, such as crystal violet lactone, and 3,3-bis(1'-ethyl-2-methylindol-3'-yl) phthalide, the lactone fluorans, such as 2-dibenzylamino-6-diethylaminofluoran and 6-diethylamino-1,3-dimethylfluorans, the lactone xanthenes, the leucoauramines, the 20(omega substituted vinylene)-3,3-disubstituted-3-H indoles and 1,3,3-trialkylindolinospirans. Mixtures of these color precursors can be used if desired. In the preferred process of this invention microencapsulated oil solutions of color precursors are used. The color precursors are preferably present in such oil solutions, sometimes referred to as carrier oil solutions, in an amount of from about 0.5% to about 20.0% based on the weight of the carrier oil solution, and the most preferred range is from about 2% to about 7%.

The radiation curable substance useful in the practice of this invention comprises the free radical polymerizable ethylenically unsaturated organic compounds. These compounds must contain at least one terminal ethylenic group per molecule. They are liquid and act as dispersing media for the chromogenic material and other ingredients of the coating composition. They are curable to a solid resin when exposed to ionizing or ultraviolet radiation. Curing is by polymerization.

A preferred group of radiation curable compounds are the polyfunctional ethylenically unsaturated organic compounds which have more than one (two or more) terminal ethylenic groups per molecule. Due to the polyfunctional nature of these compounds, they cure under the influence of radiation by polymerization, including crosslinking, to form a hard dry tack-free film.

Included in this preferred group of radiation curable compounds are the polyesters of ethylenically unsaturated acids such as acrylic acid and methacrylic acids, and a polyhydric alcohol. Examples of some of these polyfunctional compounds are the polyacrylates or methacrylates of trimethylolpropane, pentaerythritol, dipentaerythritol, ethylene glycol, triethylene glycol, propyleneglycol, glycerin, sorbitol, enopentylglycol and 1,6-hexanediol, hydroxy-terminated polyesters, hydroxy-terminated epoxy resins, and hydroxy-terminated polyurethanes and polyphenols such as bisphenol A. An example of a polyacrylate of a hydroxy-terminated polyurethane found to be useful in this invention is di(2'-acryloxyethyl)-4-methylphenylenediurethane.

Also included in this group are polyallyl and polyvinyl compounds such as diallyl phthalate and tetrallyloxyethane, and divinyl adipate, butane divinyl ether and divinylbenzene. Mixtures of these polyfunctional compounds and their oligomers and prepolymers may be used if desired.

A second group of radiation curable compounds are the monofunctional ethylenically unsaturated organic compounds which have one terminal ethylenic group per molecule. Examples of such monofunctional compounds are the $C_8$ to $C_{16}$ alcohol esters of acrylic and methacrylic acid, and styrene, substituted styrenes, vinyl acetate, vinyl ethers and allyl ethers and esters. In general, these compounds are liquid and have a lower viscosity than the polyfunctional compounds and thus may be used to reduce the viscosity of the coating composition to facilitate coating by any desired method. These compounds are radiation curable and react with the ethylenically unsaturated polyfunctional organic compounds during radiation curing to give a hard drying flexible film. Compounds having only one terminal ethylenic group may be used alone as the radiation curable substance. However, the resultant radiation cured film may be rather soft and pliable and may be somewhat too tacky for commercial use. The preferred radiation curable substance is a mixture containing one or more polyfunctional compounds and one or more monofunctional compounds. By proper selection of these compounds a chromogenic coating composition having the desired coating characteristics for any type of coating application can be made, and a hard, flexible tack-free radiation cured film can be obtained. In general, the most desired films are obtained by using a radiation curable substance comprising from about 33% to about 67% of the polyfunctional compounds to about 33% to about 67% of the monofunctional compounds.

A photoinitiator is preferably added to the coating compositions if the composition is to be cured by ultraviolet radiation. A wide variety of photoinitiators are available which serve well in the system described in this invention. The preferred photoinitiators are the benzoin alkyl ethers, such as, Vicure 30 (a mixture of alkylbenzoin ethers manufactured and sold by Stauffer Chemical Co., Westport, Connecticut), benzoin butyl ether (Vicure 10, Stauffer), benzoin methyl ether, and α,α-diethoxyacetophenone. Other photoinitiators which have been used are benzophenone,4,4'-bis(dimethylamino)benzophenone, ferrocene, xanthone, thioxanthane, α,α-azobisisobutylnitrile, decabromodiphenyl oxide, pentabromomonchlorocyclohexane, pentachlorobenzene, polychlorinated biphenyls such as the Arochlor 1200 series (manufactured and sold by Monsanto Chemical Co., St. Louis, Missouri), benzoin ethyl ether,2-ethylanthroquinone,1-(chloroethyl)naphthalene, desyl chloride, chlorendic anhydride, naphthalene sulfonyl chloride and 2-bromoethyl ethyl ether. Zinc oxide combined with a small quantity of water also serves as a good substitute photoinitiation system. The amount of photoinitiator added can be from about 0.2% to about 10% by weight of the coating composition, with a preferred range being from about 3% to about 8% by weight.

Photoinitiation synergists can also be added to the ultraviolet curing coating compositions. Photoinitiation synergists serve to enhance the initiation efficiency of the photoinitiators. The preferred synergists are chain transfer agents, such as the tertiary alcoholamines and substituted morpholines, such as triethanolamine, N-methyldiethanolamine, N,N-dimethylethanolamine and N-methylmorpholine. The amount of photoinitiation synergist added can be from about 0.2% to about 10% by weight of the coating composition, with a preferred range being from about 3% to about 8% by weight.

Filler materials can be added as flattening agents, particularly to color developing coating compositions, to reduce the glossy appearance of the cured resin films and preserve the appearance of the substrate prior to coating. Thus a bond paper which has been coated with the coating composition of this invention and which is then cured to a solid film gives the impression of being an uncoated bond paper.

The preferred filler materials are of the colloidally precipitated or fumed silicas. Typical of the silicas which can be used are the ones tradenamed LoVel 27 (a precipitated silica manufactured and sold by PPG Industries, Inc., Pittsburgh, Pennsylvania), Syloid 72 (a hydrogel silica manufactured and sold by W. R. Grace & Co., Davison Chemical Division, Baltimore, Maryland) and Cab-o-sil (a fumed silica manufactured and sold by Cabot Corporation, Boston, Massachusetts). All of these silicas are known to give an initial bluish color with color precursors such as crystal violet lactone. However, this color fades quickly on aging. Using the record sheet produced by the process of this invention, the developed color does not fade easily. It is theorized that the filler material through its large surface area provides for increased porosity of the cured resin film, thereby promoting more rapid and more complete transfer of an oily solution of color precursors from a transfer sheet to the record sheet surface. The amount of filler materials can be up to about 15% by weight of the coating composition and the preferred range is from about 10% to about 15% by weight.

Mixing of the ingredients of the coating composition is not critical. Ingredients can be added one at a time or they can be added all at once and stirred until they are uniformly mixed. Good results are obtained when the ingredients making up the radiation curable substance and the chromogenic material are heated with stirring to facilitate blending of these ingredients. If used, the photoinitiator, photoinitiation synergist and filler are best added when the coating composition is at or slightly above room temperature. It is also preferable to add microcapsules at room temperature.

The chromogenic coating composition can be applied to a substrate, such as paper or a plastic film by any of the common paper coating processes such as roll, air knife, or blade coating, or by any of the common printing processes, such as offset, gravure, or flexographic printing. The rheological properties, particularly the viscosity, of the coating composition, can be adjusted for each type of application by proper selection of the type and relative amounts of liquid radiation curable compounds. While the actual amount of chromogenic coating composition applied to the substrate can vary depending on the particular final product desired, for purposes of coating paper substrates CB coat weights of from about 1 pound to about 8 pounds per 3300 square feet of substrate have been found practical. The preferred range of CB coat weight application is from about 2.5 pounds to about 5.0 pounds per 3300 square feet of substrate, while the most preferred range is from about 3 pounds to about 4 pounds per 3300 square feet of substrate. Correspondingly, the practical range of coat weights for the CF chromogenic coating compositions of this invention are from about 0.2 pounds to about 8 pounds per 3300 square feet of substrate, the preferred range being from about 0.5 pounds to about 4 pounds per 3300 square feet of substrate and the most preferred range from about 1.0 pounds to about 3.0 pounds per 3300 square feet of substrate. If the CF and CB chromogenic materials are combined into a single or self-contained chromogenic coating compositions practical coat weights include from about 2.0 to about 9.0 pounds per 3300 square feet of substrate, the preferred coat weight is from about 3.0 pounds to about 6.0 pounds per 3300 square feet, and the most preferred range is from about 4.0 pounds to about 5.0 pounds per 3300 square feet of substrate.

These coating compositions can be cured by any free radical initiated chain propagated addition polymerization reaction of the terminal ethylenic groups of the radiation curable compounds. These free radicals can be produced by several difference chemical processes including the thermal or ultraviolet induced degradation of a molecular species and any form of ionizing radiation utilizing alpha-particles, beta-rays (high-energy electrons), gamma-rays, x-rays and neutrons. The actual exposure time necessary for curing of the chromogenic coating composition is dependent on a number of variables such as coat weight, coat thickness, the particular radiation curable substance, type of radiation, source of radiation, radiation intensity and distance between the radiation source and the coated substrate. In most instances curing is virtually instantaneous with actual curing times ranging from about 1 millisecond to about 2.0 seconds. The preferred curing time is from about 0.1 seconds to about 1.0 seconds, while the most preferred curing time is from about 0.4 seconds to about 0.6 seconds.

The preferred curing process is by exposure of the coating composition to ultraviolet radiation having a wavelength of about 2000° A. to about 4000° A. For ultraviolet curing to occur the composition must contain suitable ultraviolet absorbing photoinitiators which will produce polymerization initiating free radicals upon exposure to the radiation source. A typical ultraviolet source suitable for this type of curing process is a Hanovia 200 watt medium pressure mercury lamp. Curing efficiencies of the coating composition are dependent on such parameters as the nature of the radiation curable substance, atmosphere in contact with the coating, quantum efficiency of the radiation absorbed, thickness of coating and inhibitory effects of the various materials in the composition.

In the ionizing radiation induced curing of these coating compositions a specific radiation absorbing material (photoinitiator) is not necessary. Exposure of the coating composition to a source of high energy electrons results in the spontaneous curing of the composition to a hard, tack-free coating. Any of a number of commercially available high energy electron beam or linear cathode type high energy electron sources are suitable for curing these compositions. Parameters such as the atmospheric environment and inhibitory effects of the various materials in the composition play an important role in the determination of the curing efficiency of these compositions.

In the preferred application of the process and products of this invention a manifold carbonless form is produced. In this process a continuous web is marked with a pattern on at least one surface. A non-aqueous, solvent-free radiation curable coating of chromogenic material is applied to at least a portion of at least one surface of the continuous web. The coated surface is then exposed to radiation for a period of time sufficient to cure the coating to a tack-free film. The continuous web having the cured coating is then combined with at least one additional continuous web which has been previously or simultaneously coated and cured with radiation curable material and radiation respectively. A manifold carbonless form is then made by a variety of collating and finishing steps. Such a process and product are described in commonly assigned, co-pending application entitled "Manifold Carbonless Form and Process for the Continuous Production Thereof (Custom)" filed on even date herewith and which is incorporated hereby by reference.

In the most preferred application of the process and products of this invention a manifold form is continuously produced. In this most preferred embodiment a plurality of continuous webs are advanced at substantially the same speed, the plurality of continuous webs being spaced apart and being advanced in cooperating relationship with one another. At least one web of the plurality of continuous webs is marked with a pattern and at least one non-aqueous, solvent-free radiation curable coating containing the capsular chromogenic material is applied to at least a portion of at least one of the plurality of continuous webs. The radiation curable coating material is then set by exposure to radiation for a period of time sufficient to cure the radiation to a tack-free film. The continuous webs are then collated and placed in contiguous relationship to one another to create a manifold form. After the webs are placed in collated, contiguous relationship they can be finished by any combination of the steps of combining, partitioning, stacking, packaging and the like. Such a process and product are described in commonly assigned, co-pending application entitled "Manifold Carbonless Form and Process for the Continuous Production Thereof (Standard)" filed on even date herewith and which is incorporated hereby by reference.

The following examples further illustrate but not limit the invention.

EXAMPLE I

In one preferred embodiment of this invention, a chromogenic color-developing coating composition having the following ingredients is prepared for coating by roll coating means

| Ingredients | Parts by Weight |
|---|---|
| 1. Zinc modified p-octylphenol novolak resin (color developers) | 30 |
| 2. p-phenylphenol novolak resin (color developer) | 10 |
| 3. 1,6-Hexanediol diacrylate (radiation curable substance) | 23 |
| 4. Lauryl acrylate (radiation curable substance) | 17 |
| 5. Colloidal silica (filler) | 14 |
| 6. Benzoin butyl ether (photoinitiator) | 3 |
| 7. N-methylmorpholine (photoinitiation synergist) | 3 |
| Total | 100 |

Ingredients 1 through 4 are heated together at approximately 100° C. with low agitation stirring until the mixture of resins are completely blended. The mixture is then cooled to approximately 50° C. and ingredients 6 and 7 (the photoinitiator and photoinitiation synergist) are dissolved therein with low agitation stirring. The coating composition is cooled to room temperature and ingredient 5 is added and mixed therein using low agitation stirring to facilitate complete dispersion of the filler.

The composition was then roll coated on a bond paper substrate and the coated paper is exposed to ultraviolet light at a distance of 4 inches from the 200 watt per lineal inch ultraviolet lamps having output of ultraviolet light having a wavelength of from about 2000° A. to about 4000° A. until the coated film is essentially tack-free. The preferred weight of coating applied is from about 0.5 pounds to about 1.0 pounds per 3300 square foot ream although satisfactory coat weights down to 0.2 pounds per 3300 square foot ream have been found to work satisfactorily. Coat weights higher than 4.0 pounds per 3300 square foot ream can be used but are not necessary to give commercially acceptable results. The coated paper resembles bond paper in all physical aspects and can be used satisfactorily as the color developing sheet for lactone color precursors in pressure-sensitive papers.

EXAMPLE 2

In another preferred embodiment of this invention, spray dried hydroxypropylcellulose microcapsules containing an oil solution of a mixture of color precursors made according to the disclosure in application Ser. No. 480,956, filed May 19, 1974 in the name of Dale R. Shackle, are incorporated into a chromogenic coating composition having the following ingredients:

| Ingredients | Parts by Weight |
|---|---|
| 1. Spray dried hydroxypropylcellulose microcapsules | 30 |
| 2. 2-ethylhexyl acrylate (radiation curable substance) | 32.6 |
| 3. Pentacrythritol triacrylate (radiation curable substance) | 16.3 |
| 4. Polyfunctional acrylate oligimer - Ucar Actomer X-70 manufactured and sold by Union Carbide, New York, New York (radiation curable substance) | 16.3 |
| 5. 2(N,N-diethylamino)ethylacrylate (radiation curable substance) | 1.8 |
| 6. Vicure 30 (photoiniator) | 3.0 |
| Total | 100 |

Ingredients 2 through 6 are mixed together at room temperature under low agitation until the resins are completely blended.

The hydroxypropylcellulose microcapsules containing the oil solution of color precursors is then dispersed in the resin mixture using a Waring blender for 1 minute at high speed. The resultant dispersion of microcapsules in a liquid radiation curable composition is then coated by a blade coater on a substrate, such as bond paper, and is then cured by ultraviolet radiation under the conditions used in the previous preferred embodiment.

Coat weights can be from about 1 pound to about 8 pounds per 3300 square foot ream. From about 2.5 pounds to about 5 pounds of solids per 3300 square foot ream are preferred. The coating can also contain stilt material, such as starch granules, to prevent smudging. Paper thus prepared may be satisfactorily used as transfer sheet in combination with a pressure-sensitive record sheet containing a color developer.

EXAMPLE 3

In this preferred embodiment the leuco dye color developers, i.e., novolak resins, are dissolved in an ultraviolet curable solvent medium composed of acrylate monofunctional and polyfunctional compounds, photoinitiators, and photoinitiation synergists. Colloidal silica is added to the formulation as a filler, a color developing synergist and a flattening agent. The chromogenic color developing coating composition was made up according to the following formula:

| Ingredients | Parts by Weight |
|---|---|
| Zinc modified p-octylphenol-novolak resin (4.2% Zn) | 30.0 |
| 2-Ethylhexyl acrylate | 20.0 |
| Pentaerythritol triacrylate | 20.0 |
| p-Phenylphenol-novolak resin | 10.0 |
| Colloidal silica (Lo Vel 27 - PPG) | 14.0 |
| Benzoin methyl ether | 3.0 |
| Triethanolamine | 3.0 |
| | 100.0 |

The first four ingredients were mixed and heated to 110° C. with mild stirring until complete solution had occurred. The solution was cooled to approximately 50° C. and the last two ingredients added and the mixture stirred until complete solution. The colloidal silica was then blended in after the solution had cooled to room temperature. The MacMichael viscosity of this formulation at 28° C. was 460 poises.

The above coating composition was printed on 20 lb. bond paper with an offset printing press. A coat weight of 0.8 lbs. of coating per 3300 sq. ft. of paper was applied. The coating was then "set" or cured to a flexible, tack-free state by exposing the coated substrate to two 200 watt/linear inch ultraviolet lamps at a distance of 3 inches in an ambient atmosphere for an exposure time of approximately 0.05 seconds. The coated paper had the appearance of an uncoated bond paper.

The cured coated paper was tested by placing the coated surfaces thereof in contact with the coated side of a paper coated with microcapsules containing an oil solution of Crystal Violet Lactone. These sheet couples were imaged with an electric typewriter using the character "m" in a repeating block pattern, and the intensity of the images was measured as the ratio of the reflectance of the imaged area to the reflectance of the unimaged background, after an elapsed time of 10 minutes. Thus, the more intense or darker images show as lower values, and higher values indicate weak or faint images. This test is called Typewriter Intensity and may be expressed mathematically as $$T.I. = (100)\frac{R_i}{R_o}$$

where $R_i$ is reflectance of the imaged area and $R_o$ is reflectance of the background (unimaged) area as measured with a Bausch and Lomb Opacimeter. The typewriter intensity was 56. The definition of the letters was good and resistance to fading in light and humidity was good.

EXAMPLE 4

As an alternate process to that of Example 1 above di(2'-acryloxyethyl)-4-methylphenylene diurethane were substituted for all or part of the pentaerythritol triacrylate and/or the 2-ethylhexyl acrylate. In addition the photoinitiator (benzoin methyl ether) and the photoinitiator synergist (triethanolamine) were omitted to give a material which can be applied to a paper substrate on an offset printing press and can be cured upon exposure to a 10 megarad electron beam.

| Ingredients | Parts by Weight |
|---|---|
| 2-Ethylhexyl acrylate | 37.0 |
| p-Phenylphenol novolak resin | 42.2 |
| Di-(2'-acryloxyethyl)-4-methylphenylene-diurethane | 7.0 |
| Polychlorinated biphenyl | 0.9 |
| Colloidal silica (Lo Vel 27) | 12.9 |
| | 100 |

The MacMichael viscosity of this formulation at 28° C. was 432 poises.

The di(2'-acryloxyethyl)-4-methylphenylenediurethane was prepared by the dibutyltin dilaurate catalyzed condensation of two moles of 2-hydroxyethyl acrylate (Dow Chemical Co., Midland, Michigan) with one mole of toluene diisocyanate (NIAX isocyanate TDI, Union Carbide Corp., New York, New York). The reactants were mixed in a resin flask under an inert atmosphere and warmed to 60° C. with mild agitation for 3 hours. The dibutyltin dilaminate catalyst was then added and the reaction continued for an additional 3 hours. The resulting solid product was dissolved in the 2-ethylhexyl acrylate and added to the coating composition without further modification.

This formulation was coated on a 20# bond paper substrate with a #4 Mayer Bar to give a coat weight of 0.75 lb. per 3300 sq. ft. of substrate. The coating was cured to a flexible, tack-free state by exposure to a 10 megarad electron beam for approximately 0.1 second. The cured paper had a typing intensity of 64.

EXAMPLE 5

As an alternate process of that of Example 1 above an insoluble photoinitiation material such as the zinc oxide-oxygen-water system may be substituted for the photoinitiator and photoinitiation synergists.

| Ingredients | Parts by Weight |
|---|---|
| p-Phenylphenol novolak resin | 39.4 |
| 2-Ethylhexyl acrylate | 23.6 |
| Pentaerythritol triacrylate | 15.8 |
| Colloidal silica (Syloid 72-Grace) | 11.7 |
| Zinc Oxide | 5.5 |
| Water | 4.0 |
| | 100.0 |

The first three ingredients were mixed as described in Example 1. The Syloid 72, zinc oxide and water were added and the mixture milled until uniform. The MacMichael viscosity of this formulation at 28° C. was 100 poises.

The formulation was coated on a 13 lb. bond paper substrate with a #4 Mayer Bar to give a coat weight of 0.9 lbs. per 3300 sq. ft. of substrate. The coating was cured to a flexible, tack-free state by exposing it to two 200 watt/linear inch ultraviolet lamps for a period of 0.1 second. The cured sheet had a typewriter intensity of 62.

Although this invention has been heretofore described and illustrated with respect to color producing pairs having an acidic electron-acceptor as the color developer, it is obvious that this could be extended to other color producing pairs where one of the ingredients of the color producing pair is transferred under pressure imaging to a surface of a substrate, which surface contains the other ingredient of a color producing pair. Such a system may be illustrated by the following example.

EXAMPLE 6

The chromogenic color-developing coating composition was prepared according to Example 1 except that 2-ethylhexylgallate was substituted for the novolak resins of Example 1. The coating composition was applied to a 13# bond paper by means of a #4 Mayer Bar and the coated sheet was cured by ultraviolet radiation.

The cured sheet was tested by pressure imaging while the coated side was in contact with a sheet containing HPC microcapsules which contained a 30 parts water-66 parts glycerin solution containing 2.1 parts vanadium pentaoxide, 3.9 parts sodium hydroxide and 40 parts sodium bromide. A well defined black image was produced on the test sheet. The black color was the product of the reaction between the vanadium compound and the 3-ethylhexylgallate.

EXAMPLE 7

Microcapsules were prepared in the manner of U.S. application Ser. No. 480,956, filed May 19, 1974 by Dale R. Shackle as follows:

An oil phase was prepared by dissolving 3.78 parts of crystal voilet lactone, 0.49 parts of 3,3-bis-(1'-ethyl-2'-methylindol-3-yl)phthalide, 0.97 parts of 3-N,N-diethylamino-7-(N,N-dibenzylamino)fluoran, and 1.18 parts of 3-N,N-diethylamino-6,8-dimethylfluoran in 80 parts of methylisopropylbiphenyl (MIPB) at 90° C. and thereafter cooling to 10° C. To this oil solution of color precursors was added 3.57 parts of a liquid biuret made by reacting hexamethylene diisocyanate with water in a 3 to 1 molar ratio (Desmodur N-100, Mobay Chemical Company, Pittsburgh, Pennsylvania), 1.29 parts of trifunctional aromatic polyurethane prepolymer having a free isocyanate content of 32.5% (NIAX SF-50, Union Carbide Corporation, New York, New York), and 0.0033 parts of dibutyl tin dilaurate catalsyt. After thorough mixing, 17 parts of deodorized kerosene was added to complete the oil phase.

An aqueous phase was prepared by dissolving 3.57 parts of hydroxypropylcellulose (Klucel L, Hercules, Inc.) and 0.87 parts of methoxymethylmelamine (Parez 707, American Cyanamid Co., Wayne, New Jersey) in 154 parts of water. The oil phase and aqueous phase were mixed and vigorously stirred for about 45 minutes to give an emulsion of oil droplets in the continuous aqueous phase. The resultant emulsion was heated to 45° C. with moderate stirring for about 4 hours to form and crosslink the capsule walls. The microcapsules were spray dried to give a free flowing powder.

A radiation curable solution was prepared by dissolving 50 parts of a polyfunctional acrylate oligimer (Ucar Actomer X-70), 50 parts pentaerythritol triacrylate, 5.4 parts of 2(N,N-diethylamino)ethylacrylate (all three are made and sold by Union Carbide Corporation, New York, New York), and 8.6 parts of a benzoin ether photosensitizer for ultraviolet curable resins (Vicure 30, Stauffer Chemical Company, Westport, Connecticut) into 100 parts of 2-ethylhexyl acrylate. 30 parts of the dried microcapsules prepared as above were redispersed into 70 parts of the radiation curable mixture by a Waring blender for 1 minute with high speed. A #9 Meyer bar was used for coating this resultant emulsion onto a polyvinyl alcohol basecoated sheet, and then the sheet was cured by ultraviolet light which was generated by Ultraviolet QC 1202 AN Processor (manufactured and sold by Radiation Polymer Co., a division of PPG Industries, Pittsburgh, Pennsylvania). The transfer sheet obtained was typed in contact with a novolak resin coated second sheet producing good blue images.

EXAMPLE 8

5.9 parts of Desmodur 100 and 7.0 parts of NIAX SF-50 and 0.5 parts of N, N, N', N' - tetrakis (2-hydroxypropyl) ethylenediamine were mixed with a solution of chilled (10° C.) monoisoproyl biphenyl. The monoisopropyl biphenyl solution was prepared by heating 283 parts of monoisopropyl biphenyl with 10.7 parts of crystal violet lactone, 1.4 parts of 3,3-bis(1-thyl-2-methylindol-3-yl)-phthalide, 2.9 parts of 3-N,N-diethylamino-7-(N,N-dibenzylamino)-fluoran and 4.7 parts of 2,3-(-1'-phenyl-3'-methylpyrazolo)-7-diethylamino-4-spirophthalidochromene to 95° C. The monoisopropyl biphenyl solution was then diluted with 42.2 parts of odorless kerosene. Thereafter, said oily liquid was graudally added into a solution of 16.4 parts carboxymethyl cellulose and 32.9 parts of polyvinyl alcohol dissolved in 677 parts of water containing 0.05 parts of turkey red oil. Said aqueous solution was at 20° C. After vigorous stirring, an oil in water emulsion was prepared. With continuous stirring, said emulsion was heated to 70° C. The elevated temperature was maintained for a period of 90 minutes and as a result a dispersion of microcapsules was obtained. The microcapsules were then spray dried.

30 Parts of spray dried microcapsules prepared as above were dispersed with 70 parts of the radiation curable solution of Example 5 and coated on a polyvinyl alcohol coated paper substrate. The coated paper was cured as in Example 5. The transfer sheet obtained was typed in contact with a novolak resin coated second sheet producing good blue images.

EXAMPLE 9

An oily phase was prepared by combining into 180 parts of monoisopropyl biphenyl, 5.3 parts of crystal violet lactone, 0.62 parts of 3,3-bis-(1-ethyl-2-methylindol-3-yl)-phthalide, 1.25 parts of 3-N-N-diethylamino-7-(N,N-dibenzylamino)-fluoran, and 0.95 parts of 2,3-(-1'-phenyl-3'-methylpyrazolo)-7-diethylamino-4-spirophthalidochromene along with 122 parts of odorless kerosene. The oily solution was added slowly, under agitation, to an aqueous solution consisting of 29 parts of pork skin gelatin dissolved in 430 parts of distilled water. The gelatin sol was heated to 50° C. and the pH adjusted to 8.0 with 10% aqueous sodium hydroxide just prior to its use. Vigorous agitation was used to obtain an emulsion. The emulsion was then added to a beaker containing 19.5 parts of gum arabic dissolved in 1250 parts of deionized water. The gum arabic sol was heated to 50° C. To the beaker was then added 21 parts of 5% aqueous polyvinylmethylether/maleic anhydride copolymer and the contents of the beaker was adjusted to a pH of 10.0 using 10% aqueous sodium hydroxide. With the contents at a temperature of 50° C., 35 parts of 15.75% acetic acid was added dropwise and slowly, i.e., over a 30 minute period, to the contents of the beaker which was under mild agitation. The final pH of the contents after that addition was 4.3. The contents were then cooled to 10° C. with continued agitation. Thereafter, 34 parts of 5% aqueous polyvinylmethylether/maleic anhydride copolymer and 1.5 parts of a sodium salt of a sulfonated naphthaleneformaldehyde condensate (Tamol SN) were added to the beaker. After stirring an additional 10 minutes, 14 parts of 50% glutaraldehyde was added to the beaker. After stirring an additional 45 minutes, the pH was adjusted to 5.2 with 10% aqueous caustic. After stirring an additional 30 minutes, the pH was adjusted to 10.0 with 10% aqueous sodium hydroxide. The resulting microcapsules were spray dried.

30 Parts of spray dried gelatin microcapsules prepared as above were dispersed with 70 parts of the radiation curable solution of Example 5 and coated on a polyvinyl alcohol coated paper substrate. The coated paper was cured as in Example 5. The transfer sheet obtained was typed in contact with a novolak resin coated second sheet producing good blue images.

What is claimed is:

1. A liquid chromogenic coating composition, said coating composition being characterized as substantially solvent-free and comprising a chromogenic material and a liquid radiation curable substance, said chromogenic material being a color developer of the acidic electron accepting type, said coating composition and said radiation curable substance being compatible with the color forming characteristics of said color developer, said radiation curable substance including one or a mixture of ethylenically unsaturated organic compounds having at least one terminal ethylenic group per molecule, said liquid chromogenic coating composition being radiation curable by free radical polymerization to a solid tack-free resin.

2. The coating composition of claim 1 in which said acidic electron acceptor is selected from the group consisting of the novolaks of p-phenylphenol, p-octylphenol and p-tert-butylphenol, the zinc modified novolaks of p-phenylphenol, p-octylphenol and p-tert-butylphenol and mixtures thereof.

3. The coating composition of claim 1 in which said color precursor is present in said coating composition as an oil solution of said precursor in microcapsular form.

4. A liquid chromogenic coating composition, said coating composition being characterized as substantially solvent-free and comprising a chromogenic material and a liquid radiation curable substance, said chromogenic material being a color precursor, said color precursor being of the electron-donor type, said coating composition and said radiation curable substance being compatible with the color forming characteristics of said color precursor, said radiation curable substance including one or a mixture of ethylenically unsaturated organic compounds having at least one terminal ethylenic group per molecule, said liquid chromogenic coating composition being radiation curable by free radical polymerization to a solid tack-free resin.

5. The coating composition of claim 4 in which said color precursor is selected from the group consisting of lactone phthalides, lactone fluorans, lactone xanthenes, leucoauramines, 2-(omega substituted vinylene)3,3-disubstituted-3-H-indoles,1,3,3-trialkylindolinospirans and mixtures thereof.

* * * * *